(12) United States Patent
Karn et al.

(10) Patent No.: US 9,936,157 B2
(45) Date of Patent: *Apr. 3, 2018

(54) METHOD FOR DELETING DATA FILES IN AN ELECTRONIC DEVICE

(71) Applicant: Monument Peak Ventures, LLC, Plano, TX (US)

(72) Inventors: Keith Stoll Karn, Narbeth, PA (US); Thomas A. Napoli, Webster, NY (US); Frank W. Armstrong, Rochester, NY (US)

(73) Assignee: MONUMENT PEAK VENTURES, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,512

(22) Filed: Jan. 10, 2017

(65) Prior Publication Data

US 2017/0214881 A1 Jul. 27, 2017

Related U.S. Application Data

(63) Continuation of application No. 14/592,274, filed on Jan. 8, 2015, now Pat. No. 9,549,095, which is a (Continued)

(51) Int. Cl.
*H04N 5/77* (2006.01)
*G11B 27/34* (2006.01)

(52) U.S. Cl.
CPC ............... *H04N 5/77* (2013.01); *G11B 27/34* (2013.01)

(58) Field of Classification Search
CPC .................................. H04N 5/77; G11B 27/34
See application file for complete search history.

(56) References Cited

U.S. PATENT DOCUMENTS

| 3,971,065 | A | | 7/1976 | Bayer |
| 5,019,906 | A | * | 5/1991 | Wesolowski ........... H04N 17/06 348/497 |

(Continued)

FOREIGN PATENT DOCUMENTS

| EP | 1176538 A2 | 1/2002 |
| EP | 1339214 A1 | 8/2003 |

(Continued)

OTHER PUBLICATIONS

Notice of Allowance dated Jan. 10, 2014, for U.S. Appl. No. 12/642,275, filed Dec. 18, 2009, 9 pages.

(Continued)

*Primary Examiner* — Tuan Ho
(74) *Attorney, Agent, or Firm* — Ascenda Law Group, PC (57) ABSTRACT

The present disclosure relates to a an electronic device such as a digital camera 300 that includes a deletion mode whereby a camera/electronic device user can delete captured images or data files that have already been transferred in order to make room in the electronic device or digital camera memory for capturing further images. In one embodiment a digital camera keep track of which images have already been transferred to an external storage device and presents those to the user as potential images to be deleted. In another embodiment, the user is presented with a "delete all transferred images" which when selected deletes all the captured images that have already been transferred. In still another embodiment, a deletion criteria is used to prioritize which images are deleted first.

20 Claims, 9 Drawing Sheets

Related U.S. Application Data continuation of application No. 14/250,689, filed on Apr. 11, 2014, now Pat. No. 8,964,064, which is a continuation of application No. 12/642,275, filed on Dec. 18, 2009, now Pat. No. 8,730,351.

(60) Provisional application No. 61/138,729, filed on Dec. 18, 2008.

(56) References Cited

U.S. PATENT DOCUMENTS

| | | | |
|---|---|---|---|
| 5,473,370 | A | 12/1995 | Moronaga et al. |
| 5,757,362 | A * | 5/1998 | Levine ................ G06F 3/0308 345/158 |
| 6,292,218 | B1 | 9/2001 | Parulski et al. |
| 6,784,924 | B2 | 8/2004 | Ward et al. |
| 6,885,395 | B1 | 4/2005 | Rabbani et al. |
| 7,057,648 | B2 | 6/2006 | Parulski et al. |
| 7,295,230 | B2 | 11/2007 | Takahashi et al. |
| 7,330,207 | B2 | 2/2008 | Ohmori |
| 7,369,164 | B2 | 5/2008 | Parulski et al. |
| 7,605,849 | B1 | 10/2009 | Hatanaka |
| 7,702,821 | B2 | 4/2010 | Feinberg et al. |
| 8,166,098 | B1 | 4/2012 | Reardon |
| 2002/0176005 | A1 | 11/2002 | Okamoto et al. |
| 2003/0012566 | A1 | 1/2003 | Kindaichi |
| 2005/0191729 | A1 | 9/2005 | Kaczmarek et al. |
| 2006/0226232 | A1 | 10/2006 | Helkio et al. |
| 2006/0282472 | A1 | 12/2006 | Ng et al. |
| 2007/0129058 | A1 | 6/2007 | Landschaft et al. |
| 2007/0285714 | A1 | 12/2007 | Hirayama et al. |
| 2008/0158367 | A1 | 7/2008 | Ohmura et al. |
| 2009/0033748 | A1 | 2/2009 | Ejima et al. |

FOREIGN PATENT DOCUMENTS

| | | |
|---|---|---|
| JP | 2002094858 A | 3/2002 |
| JP | 2002369120 A | 12/2002 |
| JP | 2003023593 A | 1/2003 |
| JP | 2005269333 A | 9/2005 |
| JP | 2007081741 A | 3/2007 |
| JP | 2007243568 A | 9/2007 |
| WO | 2006/134933 A1 | 12/2006 |

OTHER PUBLICATIONS

Amendment and Reply filed Dec. 10, 2013, for U.S. Appl. No. 12/642,275, filed Dec. 18, 2009, 11 pages.
Final Office Action dated Sep. 18, 2013, for U.S. Appl. No. 12/642,275, filed Dec. 18, 2009, 14 pages.
Amendment and Reply filed Jul. 11, 2013, for U.S. Appl. No. 12/642,275, filed Dec. 18, 2009, 13 pages.
Non-Final Office Action filed Apr. 15, 2013, for U.S. Appl. No. 12/642,275, filed Dec. 18, 2009, 13 pages.
Amendment filed Dec. 11, 2012, for U.S. Appl. No. 12/642,275, filed Dec. 18, 2009, 7 pages.
Final Office Action dated Oct. 15, 2012, for U.S. Appl. No. 12/642,275, filed Dec. 18, 2009, 13 pages.
Amendment filed Aug. 22, 2012, for U.S. Appl. No. 12/642,275, filed Dec. 18, 2009, 6 pages.
Non-Final Office Action dated May 31, 2012, for U.S. Appl. No. 12/642,275, filed Dec. 18, 2009, 18 pages.
Amendment filed Apr. 13, 2012, for U.S. Appl. No. 12/642,275, filed Dec. 18, 2009, 10 pages.
Final Office Action dated Feb. 10, 2012, for U.S. Appl. No. 12/642,275, filed Dec. 18, 2009, 17 pages.
Amendment filed Nov. 17, 2011, for U.S. Appl. No. 12/642,275, filed Dec. 18, 2009, 7 pages.
Non-Final Office Action dated Sep. 29, 2011, for U.S. Appl. No. 12/642,275, filed Dec. 18, 2009, 15 pages.
Notice of Allowance dated Oct. 20, 2014, for U.S. Appl. No. 14/250,689, filed Apr. 11, 2014, 9 pages.
Amendment and Reply filed Aug. 18, 2014, for U.S. Appl. No. 14/250,689, filed Apr. 11, 2014, 7 pages.
Non-Final Office Action dated May 23, 2014, for U.S. Appl. No. 14/250,689, filed Apr. 11, 2014, 6 pages.
Notice of Allowance dated Sep. 12, 2016, for U.S. Appl. No. 14/592,274, filed Jan. 8, 2015, 7 pages.
Amendment and Reply filed Aug. 2, 2016, for U.S. Appl. No. 14/592,274, filed Jan. 8, 2015, 7 pages.
Non-Final Office Action dated Aug. 1, 2016, for U.S. Appl. No. 14/592,274, filed Jan. 8, 2015, 12 pages.

* cited by examiner

```xml
<?XML VERSION="1.0" ENCODING="UTF-8"?>
<!-- EXAMPLE XML ENCODING FOR THE FOLLOWING TWO CONDITIONS:
CABLED INTERFACE (E.G. USB):
1) "EKECUPLD.XML"
WIRELESS INTERFACE (E.G. EYE-FI):
1) "EKERUPLD.XML" -->
<KODAKTRANSFER XMLNS:XSI=" HTTP://WWW.W3.ORG/2001/XMLSCHEMA-INSTANCE"
XSI:NONAMESPACESCHEMALOCATION=" HTTP://WWW.KODAK.COM/XMLSCHEMAS/UPLOAD/EKUPLOAD.XSD">
    <HEADER>
        <TRANSFER_XML_VERSION>1.0</TRANSFER_XML_VERSION>
        <CREATOR>EASTMAN KODAK</CREATOR>
        <MODELNAME>KODAK EASYSHARE V1273 DIGITAL CAMERA</MODELNAME>
        <CAMERA_SERIAL_NUMBER>KCXJAU0000331</CAMERA_SERIAL_NUMBER>
        <FIRMVERSION>1.1.0</FIRMVERSION>
    </HEADER>
    <TRANSFER>
        <LIST>
            <ITEM>
                <PATH>../DCIM/104V1273/104_0101.JPG</PATH>
                <CAMERA_UPLOAD_STATUS>AWAITING_UPLOAD</CAMERA_UPLOAD_STATUS>
            </ITEM>
            <ITEM>
                <PATH>../DCIM/104V1273/104_0109.JPG</PATH>
                <CAMERA_UPLOAD_STATUS>AWAITING_UPLOAD</CAMERA_UPLOAD_STATUS>
            </ITEM>
            <ITEM>
                <PATH>../DCIM/104V1273/104_0120.JPG</PATH>
                <CAMERA_UPLOAD_STATUS>AWAITING_UPLOAD</CAMERA_UPLOAD_STATUS>
            </ITEM>
            <ITEM>
                <PATH>../DCIM/104V1273/10410120.WAV</PATH>
                <CAMERA_UPLOAD_STATUS>AWAITING_UPLOAD</CAMERA_UPLOAD_STATUS>
            </ITEM>
            <ITEM>
                <PATH>../DCIM/104V1273/104_0155.MOV</PATH>
                <CAMERA_UPLOAD_STATUS>AWAITING_UPLOAD</CAMERA_UPLOAD_STATUS>
            </ITEM>
        </LIST>
    </TRANSFER>
</KODAKTRANSFER>
```

METHOD FOR DELETING DATA FILES IN AN ELECTRONIC DEVICE

CROSS-REFERENCE TO RELATED PATENT APPLICATIONS

This application is a Continuation of U.S. application Ser. No. 14/592,274, filed Jan. 8, 2015, which is a Continuation of U.S. application Ser. No. 14/250,689, filed Apr. 11, 2014 (now U.S. Pat. No. 8,964,064), which is a Continuation of U.S. application Ser. No. 12/642,275, filed Dec. 18, 2009 (now U.S. Pat. No. 8,730,351), which claims priority from Provisional Application U.S. application 61/138,729, filed Dec. 18, 2008, incorporated herein by reference in their entirety.

FIELD

The present disclosure relates to the field of electronics and more particularly to method of deleting data files such as image files.

BACKGROUND

Digital cameras are used by a growing number of consumer and professional photographers. These cameras use one or more CCD or CMOS image sensors to capture images, and digitally process these captured images to produce digital image files, which are stored in a digital memory in the camera, typically on a removable memory card. The captured image files can be transferred to local computers and other devices, such as photo printers and digital picture frames, using wired or wireless interfaces. The image files can also be transferred to websites and photo service providers, either by transferring the files from the local computers or by using a wireless interface in the digital camera that communicates with a wireless network. Suitable wireless networks include cellular networks, such as CDMA and 3GSM, and WiFi networks.

Wireless networks can provide an easy way to automatically transfer images taken by a digital camera to other devices and systems, since there is no need for the user to physically connect a cable between the camera and device, or physically take a memory card out of the camera and place it in a card reader in the computer or other device.

It is known that digital images can be wirelessly transferred from a digital camera and stored by a service provider. In particular, the digital camera can include a wireless modem and a user interface for selecting specific images to be uploaded to a service provider, and for selecting other users who are allowed to view the images, as described in commonly assigned U.S. Pat. No. 7,057,648, titled "Capturing digital images to be transferred to a service provider for storage", the disclosure of which is incorporated herein by reference.

It is known that digital cameras can communicate with network service providers using a variety of protocols, which can be selected using icons on the camera's image display, as described in commonly assigned U.S. Pat. No. 6,784,924, titled "Network configuration file for automatically transferring images from an electronic still camera", the disclosure of which is incorporated herein by reference. The camera's image display can also display feedback from the network service provider, such as "transfer in progress" and "transfer complete".

It is known that digital cameras can stores profiles that relate to how captured digital images should be transferred to other devices. The profiles can include an "image deletion preference", indicating whether the files having that preference should be deleted after being transferred from the camera to a host computer, as described in commonly assigned EP patent EP 1 339 214, the disclosure of which is incorporated herein by reference.

Because the user does not need to perform a physical action in order to wirelessly transfer images captured with a wireless digital camera, the user may not understand whether or not images captured by their camera have been transferred to other devices. For example, the user may capture some images at a remote location, where the digital camera is unable to access the wireless network. In this case, the digital images cannot be immediately transferred from the camera, and need to be transferred at a later time. For example, if the wireless camera using a WiFi modem, and the pictures are taken during a vacation to a beach, there is unlikely to be a WiFi access point which can communicate with the camera. When the user later takes the camera to a location, such as a hotel, with WiFi access, or when the user returns from their vacation to their home which has a WiFi network, they can then transfer their images. However, this requires that the user turn on the camera in order to transfer the images, which means that the transfer is not automatic. Furthermore, the user is likely to be unaware of whether or not particular images have already been wirelessly transferred from the camera. Therefore, from a practical point of view, the wireless camera may be too complicated for the user.

Users face difficulty when the camera's internal memory or a memory card attached to the camera fills up and cannot hold any further images. The users of camera 330 want to take more pictures but do not want to delete pictures that have not yet been transferred to another storage location (e.g., home PC or web site). The user may also want to maintain some pictures on the camera for sharing with friends, for example by viewing the pictures using the camera display.

BRIEF DESCRIPTION OF THE DRAWINGS

FIG. 5 is an example XML file containing image state data;

DETAILED DESCRIPTION OF THE PREFERRED EMBODIMENTS

The present disclosure relates to a digital camera that includes a wireless modem for transferring images via a wireless network to a computer. The wireless modem can utilize cellular, WiFi, Bluetooth, or other wireless communications protocols. Before taking photos, the user can select various configuration settings, including a setting that uploads captured images that have been tagged for uploading to a photo service provider or other website. If a network connection is not immediately available when the images are captured and the camera is subsequently turned off, the camera automatically wakes up at later times to check whether or not the camera has been moved to a location where a network connection is available. If a suitable network connection is available, the camera operates in a reduced power state to upload the images from the camera. In addition, the camera can conserve battery power by stopping transfers when the battery is nearly depleted (i.e. in a low battery warning condition). Data indicating whether or not each image has been uploaded and/or transferred to the user's home computer is stored in the camera, and icons are displayed along with the images, to indicate to the user whether or not an image has been transferred to their computer or uploaded to their website.

The images can be edited on the wireless digital camera, for example by cropping the image or by associating a sound recording with the image. When an image that has already been uploaded is edited, the transfer and upload status is set to show that the image is awaiting upload. The wireless digital camera also includes an image deletion feature which deletes only the images that have been saved (e.g. transferred to the user's computer or uploaded to their website).

Figure 1:
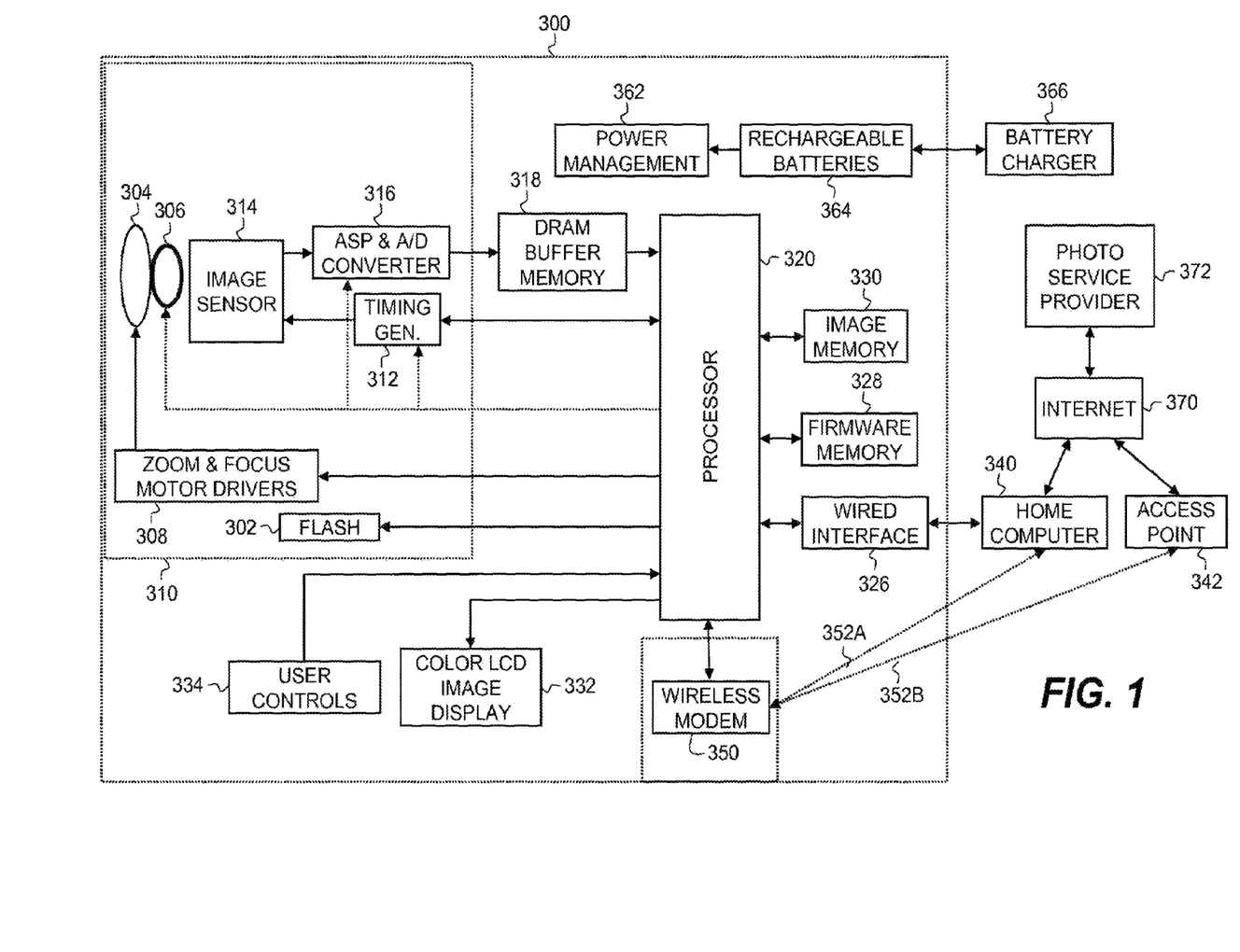
FIG. 1 depicts a block diagram of a digital photography system, including a digital camera 300.

FIG. 1 depicts a block diagram of a digital photography system, including a digital camera 300. The digital camera 300 is a portable battery operated device, small enough to be easily handheld by a user when capturing and reviewing images. The digital camera 300 can comprise a digital still camera (DSC), digital video camera (DVC), etc. The digital camera 300 produces digital images that are stored using image memory 330. The digital camera 300 includes a zoom lens 304 having an adjustable aperture and adjustable shutter 306. The zoom lens 304 is controlled by zoom and focus motor drives 308. The zoom lens 304 focuses light from a scene (not shown) on an image sensor 314, for example, a single-chip color CCD or CMOS image sensor. The output of the image sensor is converted to digital form by Analog Signal Processor (ASP) and A/D converter 316, and temporarily stored in DRAM buffer memory 318. The data stored in the DRAM buffer memory 318 is subsequently processed by a processor 320 using firmware programs stored in firmware memory 328. Alternatively, the processor 320 can be provided by custom circuitry (e.g. by one or more custom integrated circuits (ICs) designed specifically for use in digital cameras), or by a combination of programmable processor(s) and custom circuits. The processed images are then stored using image memory 330. It is understood that the image memory 330 can be a removable Flash memory card, internal Flash memory chips, magnetic memory, or optical memory. In alternative embodiments, the digital camera 300 can also capture motion video images. In alternative embodiments, the digital camera 300 can include other functions, including the functions of a digital music player (e.g. MP3 player), a mobile telephone, or a programmable digital assistant (PDA).

The image sensor 314 is controlled by a timing generator 312. The image sensor 314 can have, for example, 10.2 megapixels (3680 pixels by 2760 pixels). To provide a color image, the image sensor is overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. patent application No. US2005191729, filed on Jul. 28, 2007 and titled "Image sensor with improved light sensitivity" to Compton and Hamilton, the disclosure of which is incorporated herein by reference. These examples are not limiting, and many other color patterns may be used.

The image sensor 314 is effective when actuated in a first mode by the timing generator 312 for providing initial sensor image data, which is used for previewing the final image that will be captured in a second mode. This preview mode sensor image data is provided as a low resolution output, which can have, for example, 460 pixels by 345 pixels, which is a factor of 8 fewer rows and columns of pixels than is normally used for reading out the final image from the 10.2 megapixel sensor. The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 "Electronic camera for initiating capture of still images while previewing motion images" which is incorporated herein by reference. In an alternative embodiment, the digital camera 300 uses an optical viewfinder, and the initial sensor image data is used only to determine the exposure level of the final image, and to focus the zoom lens 304, not to provide preview images.

The image sensor 314 is also effective when actuated in a second mode by timing generator 312 for providing final sensor image data. This final mode sensor image data is provided as high resolution output image data, which for scenes having a high illumination level includes all of the pixels of the image sensor, and can be, for example, 10.2 megapixel final image data having 3680 pixels by 2760 pixels. At lower illumination levels, the final sensor image data can be provided by "binning" some number of like-colored pixels on the image sensor, in order to increase the signal level and thus the "ISO speed" of the sensor.

The zoom and focus motors 308 and the timing generator 312 are controlled by control signals supplied by processor 320, which control the exposure level of the image sensor 314, by controlling the f-number and exposure time of the adjustable aperture and adjustable shutter 306, the gain (i.e. ISO speed) setting of the ASP & A/D converter 316, and a flash 302 which can illuminate the scene.

The processor 320 also creates a lower-resolution that can be reviewed on the color LCD image display 332. Icons, including state icons (e.g. awaiting transfer/upload) may be display along with the lower-resolution image on the color LCD image display 332. The graphical user interface displayed on the color LCD image display 332 is controlled by user controls 334. The user controls 334 are used to set camera modes and parameters, and to select favorite images and images to be uploaded to a service provider, as will be described later in reference to FIG. 2.

The processor 320 also provides additional calculations, such as focus calculations used to focus the lens 304, during the preview mode. The processor 320 also provides additional processing of the final sensor image data, in order to produce rendered sRGB image data which is stored within a "finished" image file, such as a well-known Exif-JPEG image file, in the image memory 330.

The processor 320 also includes a real-time clock (not shown) which operates even in a low power state (e.g. when the digital camera is turned off) in order to maintain the correct date and time. This real-time clock can also be used to enable the processor 320 to "wake up" after a specified "sleep" interval, in order to automatically transfer images captured by the digital camera 300 at a later time, without the user initiating the transfer.

The processor 320 is coupled to a wireless modem 350, which enables the digital camera 300 to transmit and receive image files via an RF (radio frequency) link 352A and 352B. The wireless modem 350 communicates over a radio frequency (e.g. wireless) link 352B with a corresponding wireless modem in an access point 342, such as a WiFi hot spot. The wireless modem 350 can be integrated inside the digital camera 300. Alternatively, the wireless modem 350 can be included on a plug-in card, such as an SD card, that is inserted into a memory card slot (not shown) of the digital camera 300.

The wireless link 352 can utilize various wireless communications standards, such the 802.11 family of WiFi standards. Alternatively, the wireless link 352 can use other WLAN standards such as UWB, Personal Area Network standards such as Bluetooth, or cellular communications standards such as TDMA or narrowband and wideband CDMA.

The wireless link 352A enables the digital camera 300 to communicate with the user's home computer 340 in order to transfer images which may be saved on a data storage device (e.g. a hard drive) of the home computer 340. The home computer 340 can communicate via the internet 370 with a photo service provider 372, such as the Kodak Easy Share Gallery, in order to upload images captured by the digital camera 300.

The wireless link 352B enables the digital camera 300 to communicate with an access point 342, such as a WiFi hot spot. The access point 342 can communicate via the internet 370 with the user's home computer 340, in order to transfer images to a data storage device in the home computer 340. The access point 342 can also communicate via the internet 370 with photo service provider 370, in order to upload images captured by the digital camera 300. It will be understood that instead of transferring the images to home computer 340, they can be transferred to computers at other locations, or to other types of devices including network storage systems, TV set-top boxes, and the like. It will be further understood that instead of uploading images to a photo service provider such as Kodak Gallery, the images can be uploaded to many different types of image-capable websites, such as blogs, social networking websites, and file sharing websites. In additional, images can be uploaded from the digital camera 300 to another digital camera that includes a wireless modem 350.

The digital camera 300 can also transfer images to the home computer 340 using a wired interface 326. This wired interface 326 can conform to, for example, the well-known USB 2.0 interface specification.

The various subsystems of the digital camera 300 are controlled by the power management block 362, which conditions and controls the power supplied by rechargeable batteries 364. The rechargeable batteries 364 are recharged when the camera 300 is connected to the battery charger 366.

The power management block 362 can be set to several different power modes, including a capture mode for capturing images using the lens 304 and image sensor 314, a review mode for reviewing captured images on the color LCD image display 332, a reduced power mode used for automatically transferring images, and a sleep mode. In the capture mode, power is provided to all of the subsystems of the digital camera 300, except that power can be optionally applied to the wireless modem 350 and the wired interface 326 only if previously captured images are being transferred as a background task during the capture mode. In the review mode, power is not provided to the capture subsystem 310. In the reduced power mode, power is provided only to those components needed to transfer images from the image memory 330 via the processor 320 to the wireless modem 350, and to transmit the image data over the wireless link 352 In the reduced power mode, power is not provided to the capture subsystem 310 nor to the color image display 332. To indicate that the camera is functioning, a status LED (not shown) may blink, indicating that the camera is performing a background task.

Figure 2A:
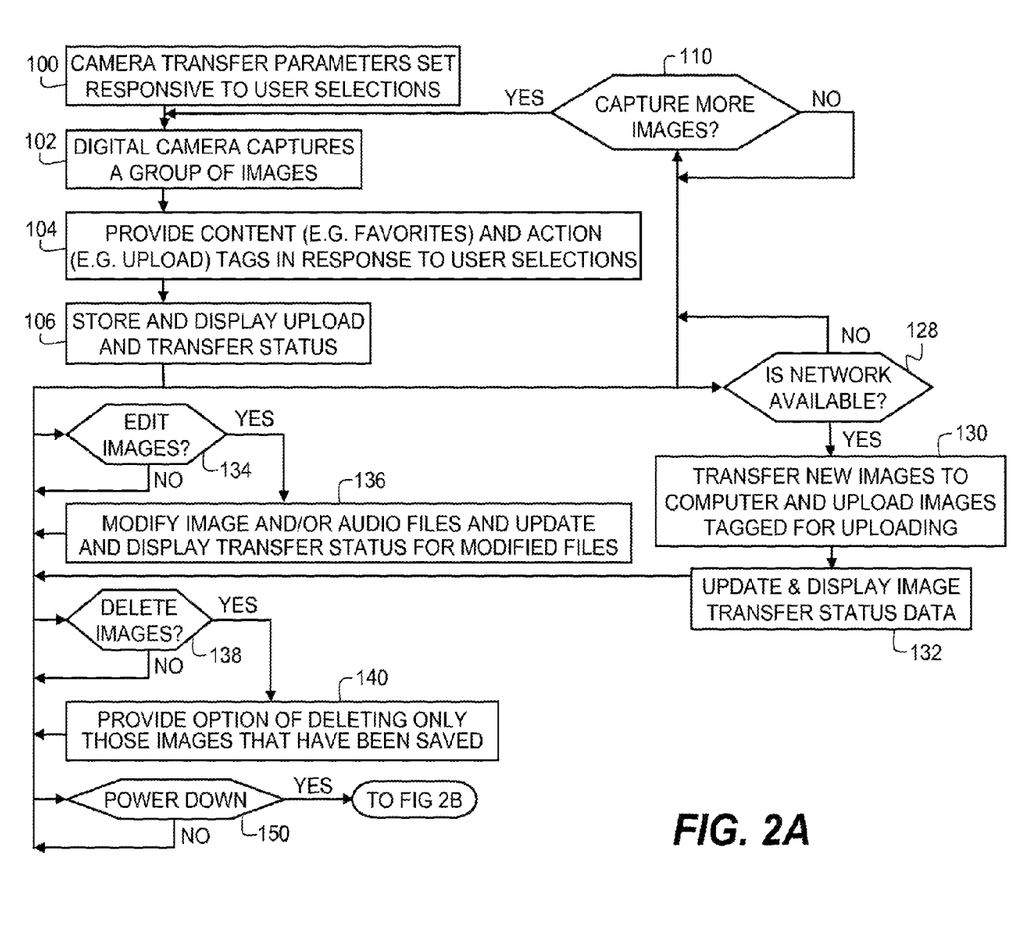
FIGS. 2A and 2B depict a flow chart of a digital camera that implements the present disclosure.
Figure 2B:
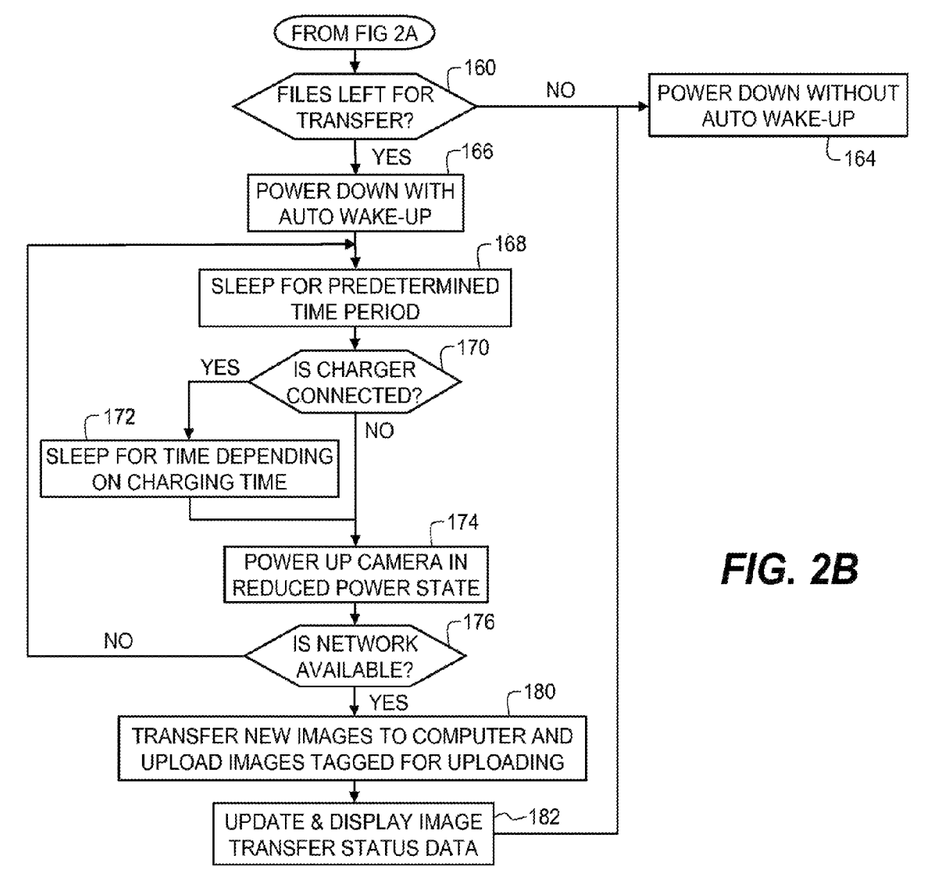

FIGS. 2A and 2B together depict a flow chart of a digital camera that implements the present disclosure.

In block 100 of FIG. 2A, before taking photos, the user can select a transfer configuration setting. The setting determines how images are tagged for uploading to the photo service provider 372. The settings include an "upload all" configuration setting in which all captured images are uploaded to the photo service provider 372, and an "upload selected images" configuration setting in which the user selects specific images to be uploaded to the service provider 372.

In block 102, the user captures a group of images using digital camera 300. These images can include still photos and motion video clips.

In block 104, the user can review images and provide content and action tags for some or all of the captured still and video images. Content tags are metadata that relate to the content of the image. Some examples of content tags include a "favorites" tag (marking a picture as a user favorite) and "keyword" tags. This can be accomplished as described in commonly-assigned U.S. Pat. No. 7,369,164 titled "Using favorite digital images to organize and identify electronic albums", the disclosure of which is incorporated herein by reference. Content tags are then associated with the appropriate images by the processor 320 responsive to user inputs provided by user controls 334.

In block 104, while the user is reviewing images, the user can also select specific "action" tags. Action tags are tags that associate a specific action with a still or video image. Examples include print tags, e-mail tags and upload tags. The upload tag indicates which images are to be uploaded to the Photo Service Provider 372. If the camera was set to the "upload all" mode in block 100, all captured images are tagged with the upload tag in block 106, without requiring user input. If the camera was set to the "upload selected images" mode in block 100, only the specific images selected by the user in block 106 are tagged for uploading. In this case, upload tags are associated with the appropriate images by the processor 320 responsive to user inputs provided by user controls 334.

In block 106, "Image state data", indicating the upload and transfer status of the images stored in the image memory 330, is stored in the digital camera 300, either in the firmware memory 328 or image memory 330. The data indicates which images are to be uploaded to Photo Service Provider 372. In addition, the data indicates which of the captured images have been transferred to a home computer 340.

Figure 3:
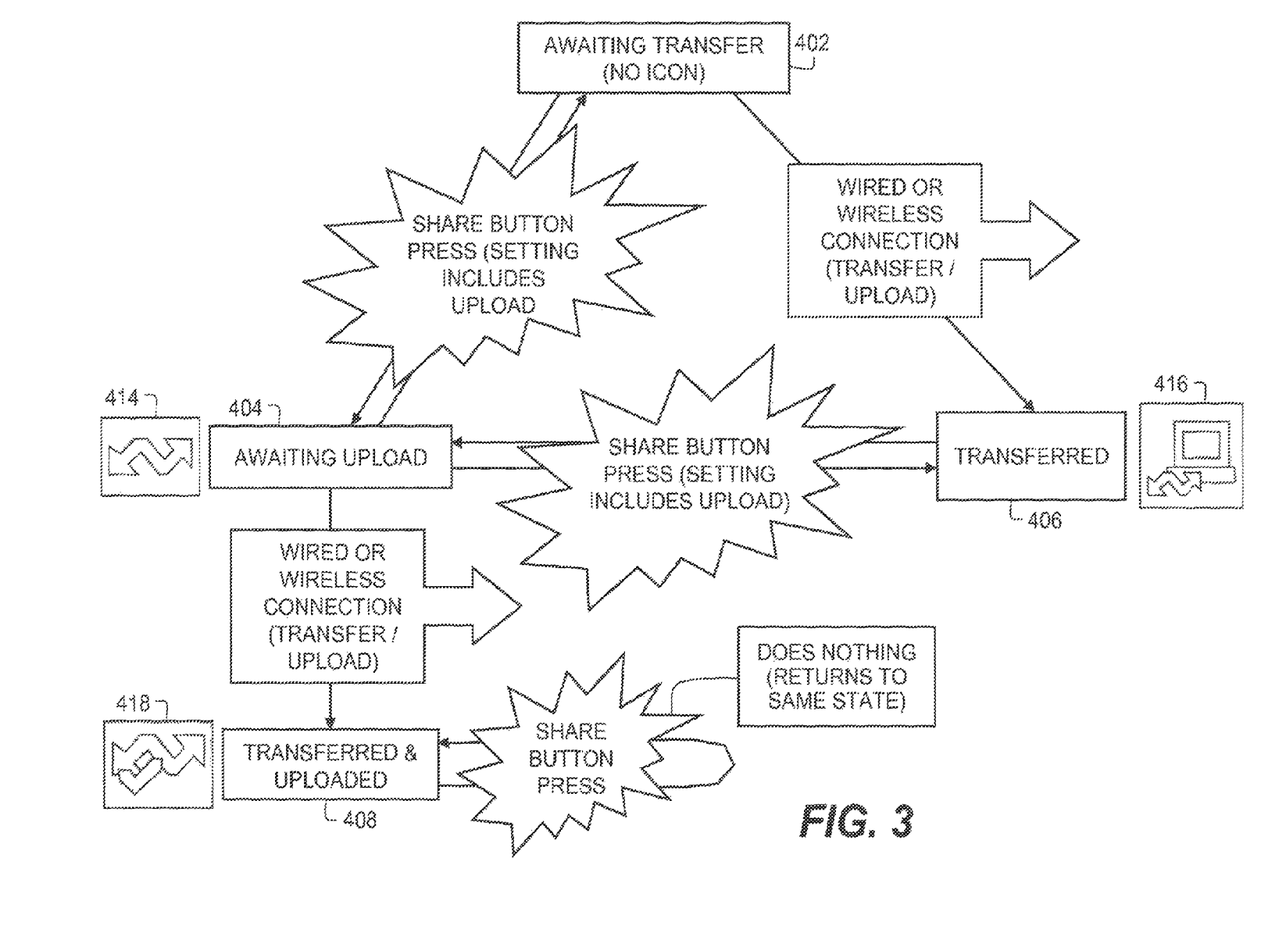
FIG. 3 is a simplified state diagram indicating the main states.

FIG. 3 is a simplified state diagram showing the various states for the captured images. The states include an "awaiting transfer" state 402, an "awaiting upload" state 404, a "transferred" state 406, and a "transferred and uploaded" state 408. Specific icons 414, 416, and 418 are used to indicate the state to the user, except for the awaiting transfer state 402, where the lack of an icon indicates that the image has been neither uploaded nor transferred.

Figure 4A:
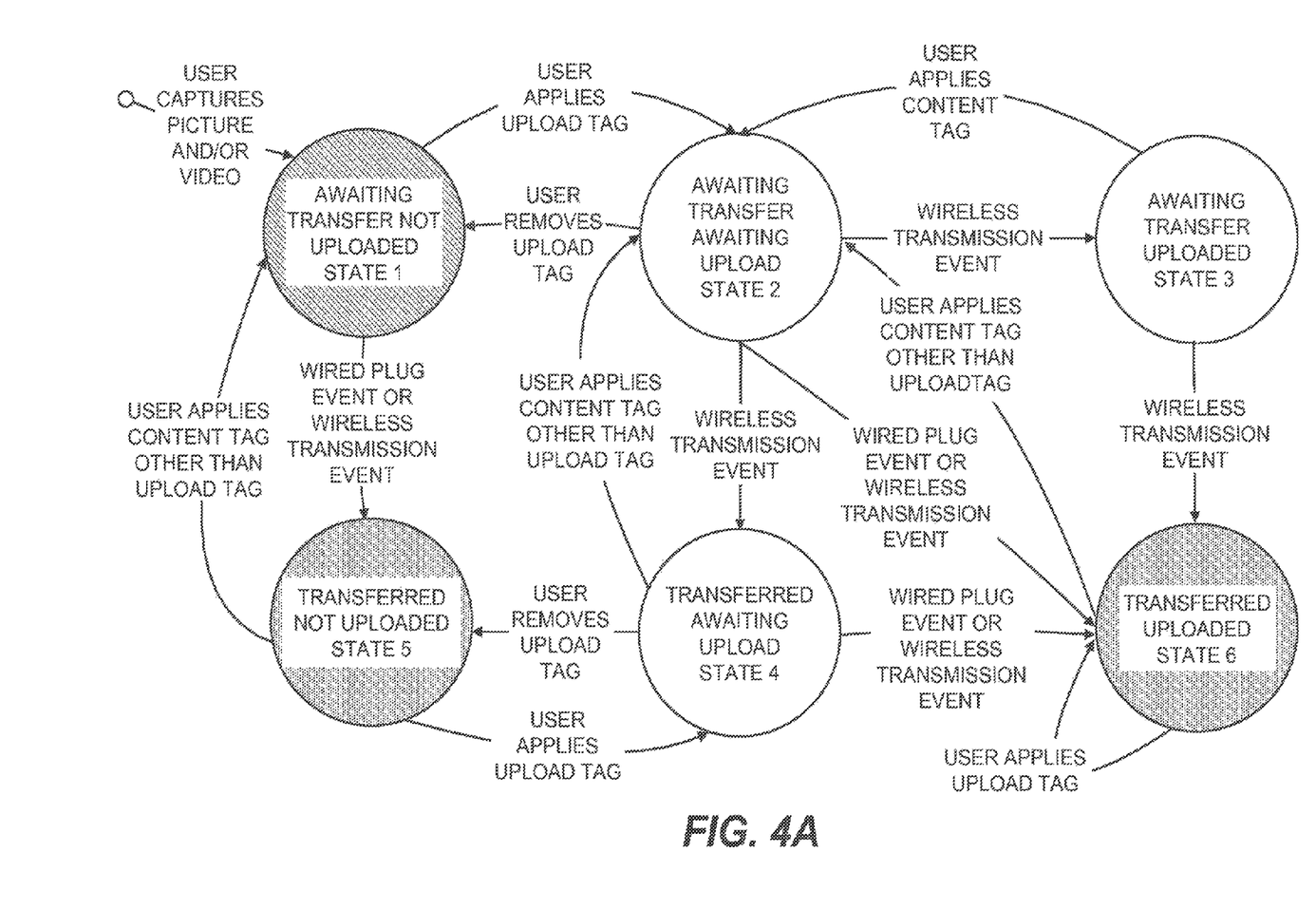
FIG. 4A is an Upload Status State Diagram for the "Selected Transfer" Configuration.

FIG. 4A shows that there are six detailed states when the user selects the "upload selected images" configuration setting in block 100. States 5 and 6 represent still or video images that have been successfully transferred from the camera. As will be described later in relation to block 140, upon entering the delete menu, the processor 320 determines if any images are in states 5 or 6. If images exist in these states, the processor 320 will present a delete option to delete 'all transferred' images along with a total count. If images exist only in states 1, 2, 3, and 4, then the user is not presented with an option to delete only the transferred images, and is instead only presented with options to delete the currently displayed image, or to delete all stored images.

Figure 4B:
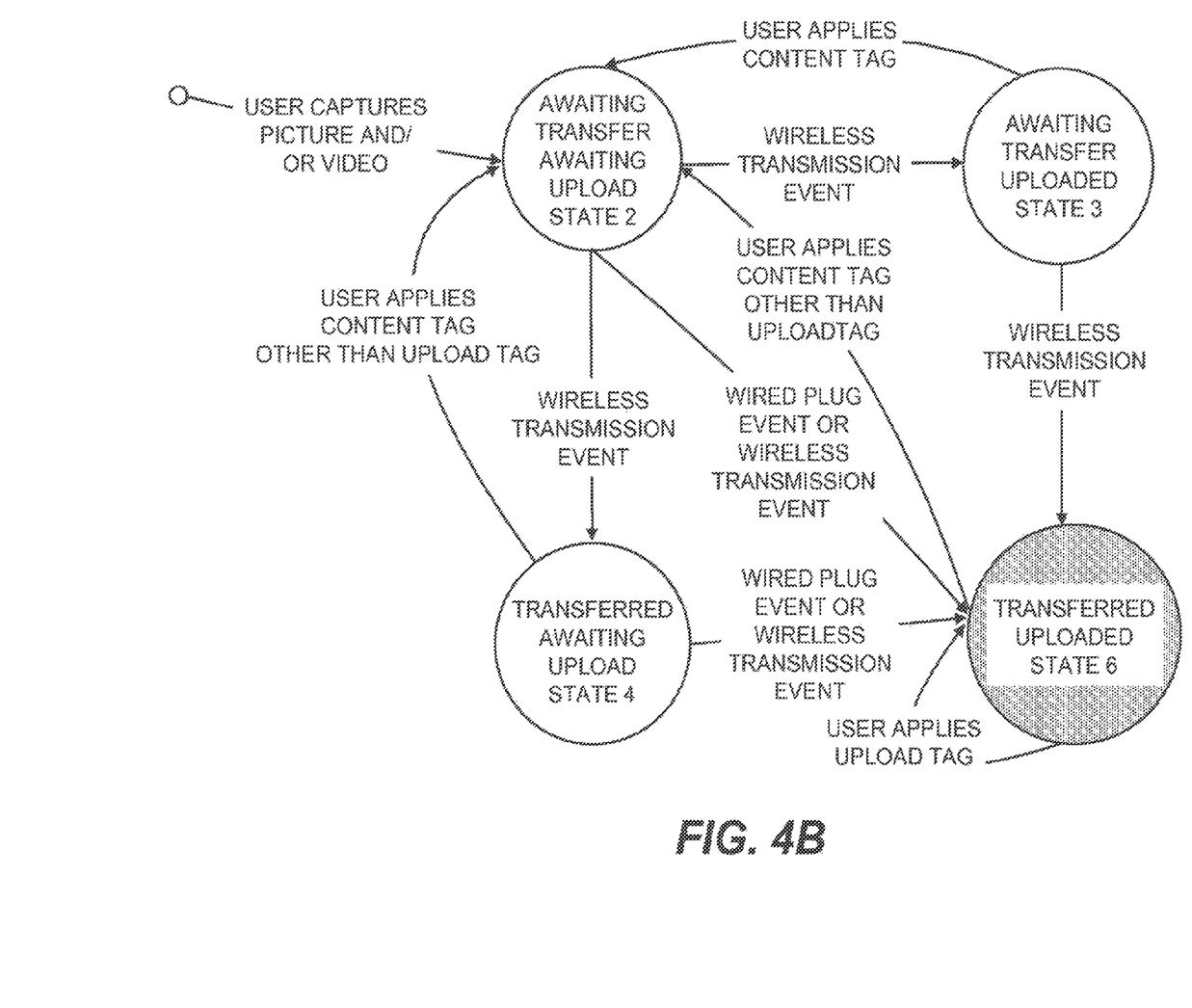
FIG. 4B is an Upload Status State Diagram for the "Transfer All" configuration.

FIG. 4B shows that there are four detailed states when the user selects the "upload all images" configuration setting in block 100. State 6 represents still or video images that have been successfully transferred from the camera. If the user chooses this configuration setting, upon entering the delete menu (block 140), the processor 320 determines if any images are in state 6. If images exist in this state, the processor 320 will present a delete option to delete 'all transferred' images along with a total count. If images exist only in states 2, 3, and 4, then the user is not presented with an option to delete only the transferred images, and is instead only presented with options to delete the currently displayed image, or to delete all stored images.

Note that a still or video image can be uploaded but not yet transferred. This may happen because the transfer destination (home computer 340) is turned off, although the still or video image has been uploaded to the photo service provider 372.

These states shown in FIGS. 4A and 4B can be aggregated into a smaller number of simplified states, for display to the user, as described in relation to FIG. 3.

FIG. 5 is an example XML file containing image state data. In this example, the user has tagged for upload the following still (JPG) and movie (MOV) files; "104_0101.JPG", "104_0109.JPG", "104_0120.JPG", and "104_0155.MOV". Image "104_0120.JPG" has an associated annotation WAV file "10410120.WAV" and this WAV file is also added to the list of files to be uploaded, as will be described later in reference to block 136.

The "header" section contains the following elements:
1. "transfer_XML_Version"—This element is the version of the XML file used to support uploading tagged assets. Initial version is set to "1.0".
2. "creator"—This element is the company name that created the XML file. For Kodak cameras this element value is set to "Eastman Kodak".
3. "modelname"—This element is the camera model name. The value of this element is identical to the Model tag value in the Exif JPEG file.
4. "camera_serial_number"—This element is the camera serial number. The value is identical to the serial number stored in the Exif MakerNotes tag.
5. "firmversion"—This element is the camera firmware version.

The "transfer" section contains the following elements:
1. "list"—This element stores a list of items or assets that have been tagged to be uploaded.
2. "item"—This element stores information about the file that has been tagged to be uploaded.

Within the item element the following element is currently defined:

1. "path"—The path of the file tagged for upload from the camera. The value of this element has been constricted to match the following syntax of a Regular Expression:
([.][.][/][/]DCIM/([A-Z]|[0-9]|[_]){8}/([A-Z]|[0-9]|[_]){8}[.]([A-Z]|[a-z]){3})
2. "camera_upload_status"—This element stores the upload status of the asset. The value of this element has been constricted to two values, "awaiting_upload" and "uploaded".

The selection of a JPEG image file or a QuickTime movie file for upload in block 104 will result in a new "item" element that contains a mandatory "path" and the mandatory "camera_upload_status" elements to be added to the "list" element. If the JPEG image file has an associated WAV annotation file then automatically that WAV file is also added to a new "item" element in the "list" element of the XML file.

In block 104, it is possible for a user to deselect an image or movie file that was previously selected for uploading but that has not yet been uploaded. In this case, the XML file is updated to remove the "item" element in the "list" element that relates to the item that has been deselected for upload. If the JPEG file deselected has an associated audio WAV file that WAV file is removed from the "item" element in the "list" element that relates to this audio asset.

In block 110 of FIG. 2A the processor determines if the user wants to capture more images, for example by switching the camera from the image review to the image capture mode. If yes (yes to block 110), block 102 is repeated in order to capture additional images, and blocks 104-106 are repeated to provide content and action tags for the new images, and to provide and display appropriate image state data for these new images.

In block 128, the processor 320 in the digital camera 300 determines if the wireless modem 350 can communicate over an available network with either the home computer 340 or an access point 342.

If a network connection is available (yes to block 128), then in block 130, images stored in the image memory 330 that are in the awaiting transfer state 402 are transferred to the home computer 340, and images that are in the awaiting upload state 404 are uploaded to the Photo Service Provider 372.

In block 132, the image state data described earlier in relation to block 106 is updated (e.g. the XML file in FIG. 5 is updated), and icons are displayed along with the images, to indicate to the user whether or not an image has been transferred to their computer or uploaded to their website.

In block 134, the user can select an image editing mode so that specific images can be viewed on the image display 332 and edited using the user controls 334.

If the user decides to edit one or more images (yes to block 134), then in block 136 the image is edited in response to user inputs from user controls 334. The editing can include common image editing operations, such as cropping, color adjustments, and red-eye correction. The editing can also include recording sounds using a microphone (not shown) in the digital camera 300. This audio data can then be associated with the edited digital image file, for example by including the audio data within the image file, or by adding an associated audio tag to the image file that provides the name of the audio file.

When images are edited in block 136, the image state data for the edited image is updated to show that the image is now awaiting transfer (402 in FIG. 3). This is done, even if the unedited image (or previously edited image) has already been transferred to the photo service provider 372 and/or uploaded to the home computer 340, because the edited image is now different that the image that was uploaded and/or transferred. Therefore, the edited image needs to be uploaded and/or transferred.

In block 138, the user can select the image deletion feature in order to delete some of the images stored in the image memory 330 of the digital camera 300. If the user selects the image deletion mode (yes to block 138), then in block 140 the image display 332 provides the user with the options of deleting either (1) a single image (e.g. the currently displayed images), (2) all of the stored images, or (3) only those stored images that have already been transferred to the home computer 340, as indicated by the "image state data" stored in the XML file described in relation to FIG. 5.

In block 150, the user can select to power down the digital camera 300. In this case (yes to block 150) the flow diagram shown in FIG. 2B is followed.

In block 160 of FIG. 2B, the processor 320 determines if some of the images stored in the image memory 330 have not yet been transferred. This determination can be made from the image state data described in relation to FIG. 5.

If all of the images have been transferred (no to block 160), then in block 164 the camera is powered down without using auto wake-up. In this case, the camera will not be powered up again until the user turns the camera on again at a later time.

If some images require transferring (yes to block 160), then in block 116 the processor 320 in the digital camera 300 powers down the camera in a "sleep" mode, so that it automatically wakes up at a later time and attempts to transfer the images. This is done because it is likely that the user, at some point, will move the digital camera 300 to a location that can access a suitable wireless network 352. For example, the user may take the camera from a remote location to public hotspot, or to their home.

In block 168 the sleep time is set to be equal to the predetermined time period. This time period can optionally be set by the user in step 100. A typical default time period is 4 hours. Therefore, if the real-time clock in the camera has a current time of 9:30 pm, the camera will be set to automatically power up, in reduced power mode, at 1:30 pm.

In block 170, the processor 320 in the digital camera 300 determines whether or not the battery charger 366 has been connected to the digital camera 300.

If the battery charger 366 is connected (yes to block 170), in block 172 the sleep time is set for a time based on the battery charging time. This is done so that battery charging takes priority, in order for the user to be able to take more pictures. For example, if the battery normally takes 2 hours to charge, the sleep time can be set to be 2 hours if the battery is fully depleted, and can be set to 1 hour is the battery is approximately halfway charged.

In block 174, the camera is powered up in the reduced power state, which was described earlier in relation to FIG. 1.

In block 176, the processor 320 in the digital camera 300 determines if the wireless modem 350 can communicate over an available network with either the home computer 340 or an access point 342.

If a network connection is not available (no to block 176), blocks 168 to 176 are repeated. In other words, the digital camera 300 automatically wakes up again at a later time to check whether or not the camera has been moved to a location where a network connection is available. In some embodiments, the predetermined time period in block 168 can be changed after block 168 is repeated several times. For example, the predetermined time period can be a relatively short (e.g. 1 hour initially), and then be much longer (e.g. 8 hours) after several repetitions in order to conserve battery power.

If a network connection is available (yes to block 128), then in block 180, images stored in the image memory 330 that are in the awaiting transfer state 402 are transferred to the home computer 340, and images that are in the awaiting upload state 404 are uploaded to the Photo Service Provider 372, as described earlier in relation to block 130.

In block 182, the image state data described earlier in relation to block 106 is updated (e.g. the XML file in FIG. 5 is updated), and icons are displayed along with the images, to indicate to the user whether or not an image has been transferred to their computer or uploaded to their website, as described earlier in relation to block 132. Then, in block 164, the digital camera 300 is powered down without auto wake-up, until the user turns on the camera at a later time.

In some embodiments, the user can select a "manual" transfer mode in block 100. When the camera is set to manual operation, the camera does not perform the automatic uploads described in relation to blocks 160-182 of FIG. 2B.

Figure 6:
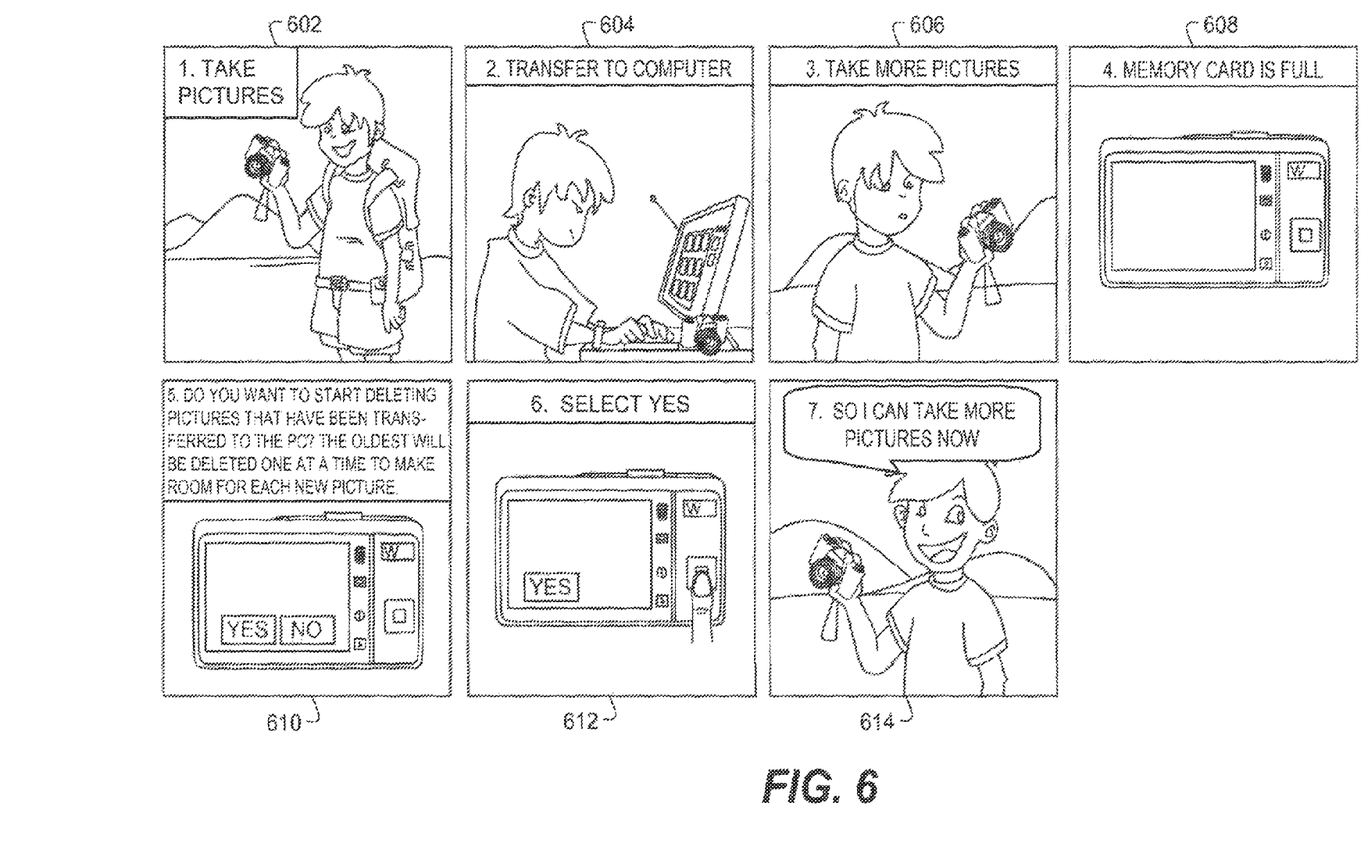
FIG. 6 shows a deletion mode in accordance with an embodiment of the disclosure.

Referring now to FIG. 6, in one embodiment, the camera user captures some pictures or videos as shown in 602, The camera in this embodiment can include a wireless modem 350 or it does not have to for transferring images to a remote storage device. After 602, the user then transfers images to an external storage device such as a computer, external memory, website, etc. but does not delete them from the camera in 604. In this embodiment the camera 300 keeps track of which pictures/images have been transferred, using for example a database file located in a memory such as a memory card used in the camera or internal camera memory. Later the user takes more pictures as shown in 606 eventually filling up the memory card in 608. The camera 300 then prompts the camera user asking if he/she wants to start deleting pictures that have been transferred to the PC one at a time in 610. When the user accepts this prompts in 612, the user places the camera 300 into an automatic deletion mode. In another embodiment, the automatic delete mode can be preset in the camera so the camera is already operating using the automatic deletion mode. The automatic deletion mode would delete pictures as necessary to maintain a minimum amount of space on the image memory (e.g., internal camera memory or removable memory card or a combination of both). This automatic deletion can be based on picture age (i.e., delete oldest images first) or image size (i.e. delete largest images first) or using some other deletion criteria.

In this embodiment, pictures that have been labeled in the database as being previously transferred to another storage location (e.g., PC, network server, external memory device, etc.) are automatically deleted. The camera deletes just enough pictures to maintain a buffer larger enough to accommodate some additional amount of pictures or videos. For example, it could maintain enough space for three more pictures or 10 seconds of video recording at the current resolution settings of the camera. The amount of memory space that is to be made available can be preset or preprogrammed by the camera user using the camera settings function. Additionally in another embodiment, if the user increases the still or video capture resolution settings in the camera, more images (that have been previously transferred) would be deleted automatically to free-up more memory. The user is then free to capture more images without worrying about losing important pictures as shown in 614.

Figure 7:
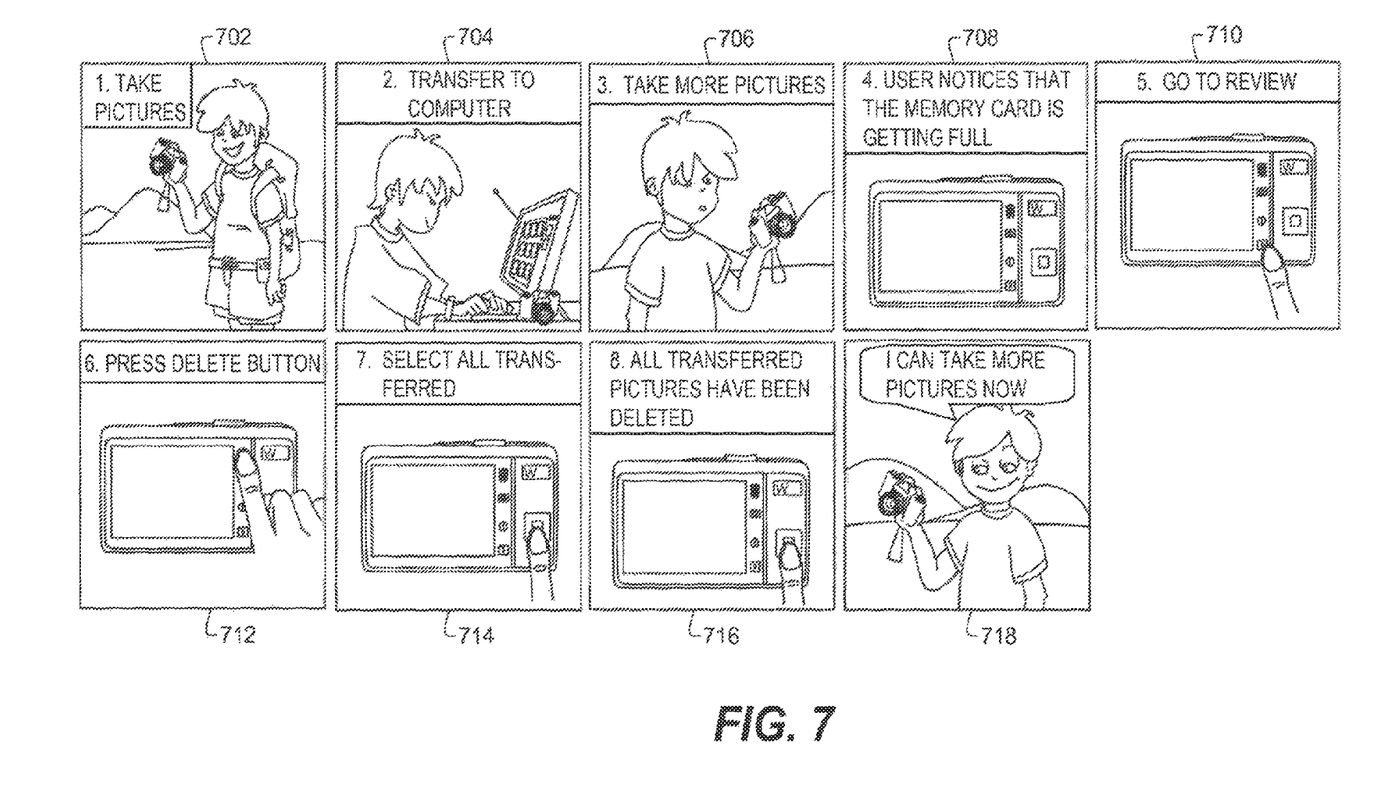
FIG. 7 shows another embodiment of a deletion mode in accordance with another embodiment of the disclosure.

In FIG. 7 there is illustrated another deletion mode embodiment in which the camera user captures some pictures or videos in 702, The camera user then transfers (wired or wirelessly) images to an external storage device such as a PC, external memory, etc. but does not delete the pictures/images from the camera 300 in 704. The camera 300 keeps track of which pictures have been transferred (e.g., in a database file on the memory card or internal camera memory). Later the user takes more pictures in 706. The user notices that the memory card is getting full in 708 and places the camera 300 into a mode such as a Review Mode or other similar mode in 710. The user then presses a Delete button, Delete icon on a touch-screen or uses another technique to cause a delete function to occur in the camera in 712. The camera may display delete option(s) including Delete All Transferred pictures/images in 714. This deletes from the camera all pictures and/or videos which have been previously transferred to the PC in 716. The user is now free to capture more images without worrying about losing important pictures in 718. Although the above deletion techniques have been described in association with a digital camera and captured images, the disclosure can also apply to electronic devices that store information such as memory cards, hard drives, electronic devices that load other types of data besides images, etc.

The disclosure has been described in detail with particular reference to certain preferred embodiments thereof, but it will be understood that variations and modifications can be effected within the spirit and scope of the disclosure. For example, numerous techniques for marking which data files/captured images have been transferred to a remote storage device can be used with the present disclosure. Which can be as simple as marking a data bit in a database associated with the data file/image.

PARTS LIST 300 digital camera
302 flash
304 zoom lens
306 adjustable aperture and adjustable shutter
308 zoom and focus motor drives
310 capture subsystem
312 timing generator
314 image sensor
316 ASP and A/D converter
318 DRAM buffer memory
320 processor
326 wired interface
328 firmware memory
330 image memory
332 color LCD image display
334 user controls
340 home computer
350 wireless modem
352 wireless link
362 power manager
364 rechargeable batteries
366 battery charger
370 Internet
372 photo service provider

What is claimed is:

1. A method comprising:
waking, from a low-power mode, a processor of an image capture device, and automatically communicating at least one of a plurality of captured images stored in a memory of the image capture device to a remote storage device;
storing, in the image capture device, data indicating which of the plurality of captured images have been communicated to the remote storage device; and
deleting, from the memory, captured images that have been stored and previously transferred to the remote storage device in response to receiving an indication that captured images that have been stored and previously communicated to the remote storage device are to be deleted.

2. The method of claim 1, wherein the indication that captured images that have been stored and previously communicated to the remote storage device are to be deleted is received from a user interface at the image capture device.

3. The method of claim 1, wherein the indication that captured images that have been stored and previously communicated to the remote storage device are to be deleted is received from a remote device.

4. The method of claim 1, wherein communicating at least one of the plurality of captured images in the memory of the image capture device to the remote storage device comprises establishing a wireless network connection and communicating the captured images over the wireless network connection.

5. The method of claim 1, wherein communicating at least one of the plurality of captured images in the memory of the image capture device to the remote storage device comprises communicating the captured images over a wired network connection to the remote storage device.

6. The method of claim 1, wherein an order in which the captured images previously transferred to the remote storage device are deleted is based on a deletion criterion.

7. The method of claim 1, wherein all messages previously transferred to the remote storage device are deleted.

8. The method of claim 1, wherein selected messages previously transferred to the remote storage device are deleted.

9. The method of claim 1, wherein the indication that captured images that have been stored and previously communicated to the remote storage device are to be deleted is provided based on an amount of available storage on the image capture device.

10. The method of claim 9, wherein the indication that captured images that have been stored and previously communicated to the remote storage device are to be deleted is provided if maintaining the at least one captured image on the image capture device would cause an available storage space on the image capture device to drop below a threshold.

11. The method of claim 1, wherein the waking is performed at various time intervals until a wireless network connection is established between the image capture device and the remote storage device, the various time intervals having longer intervals between some of them than between others of them until the wireless network connection is established.

12. The method of claim 11, wherein between the communicating of the at least one of the plurality of captured images to the remote storage device and the deleting, from the memory, of captured images that have been stored and previously transferred to the remote storage device, powering down the processor of the image capture device to the low power mode.

13. The method of claim 12, wherein an order in which the captured images previously transferred to the remote storage device are deleted is based on a deletion criterion.

14. The method of claim 12, wherein all messages previously transferred to the remote storage device are deleted.

15. The method of claim 12, wherein selected messages previously transferred to the remote storage device are deleted.

16. The method of claim 12, wherein the indication that captured images that have been stored and previously communicated to the remote storage device are to be deleted is provided based on an amount of available storage on the image capture device.

17. The method of claim 16, wherein the indication that captured images that have been stored and previously communicated to the remote storage device are to be deleted is provided if maintaining the at least one captured image on the image capture device would cause an available storage space on the image capture device to drop below a threshold.

18. An image capture device, comprising:
a processor; and
a memory, the memory storing processor-executable instructions, which instructions, when executed by the processor, cause the processor to:
wake from a low-power mode and automatically communicate at least one of a plurality of captured images stored in the memory of the image capture device to a remote storage device;
store, in the memory, data indicating which of the plurality of captured images have been communicated to the remote storage device; and
delete, from the memory, captured images that have been stored and previously transferred to the remote storage device in response to receiving an indication that captured images that have been stored and previously communicated to the remote storage device are to be deleted.

19. The image capture device of claim 18, wherein the instructions cause the processor to wake from the low-power mode at various time intervals until a wireless network connection is established between the image capture device and the remote storage device, the various time intervals having longer intervals between some of them than between others of them until the wireless network connection is established.

20. An image capture device, comprising:
a processor; and
a memory, the memory storing processor-executable instructions, which instructions, when executed by the processor, cause the processor to execute one of a manual transfer mode and an automatic transfer mode, according to a user selection therebetween, the automatic transfer mode comprising:
the processor waking from a low-power mode, and automatically communicating at least one of a plurality of captured images stored in the memory of the image capture device to a remote storage device, storing, in the image capture device, data indicating which of the plurality of captured images have been communicated to the remote storage device, and deleting, from the memory, captured images that have been stored and previously transferred to the remote storage device in response to receiving an indication that captured images that have been stored and previously communicated to the remote storage device are to be deleted, and
the manual transfer mode comprising:
the processor effecting transfer of one or more of the captured images stored in the memory of the image capture device to the remote storage device over a network in response to a user command to effect said transfer.

\* \* \* \* \*